US012580226B2

(12) United States Patent
Gerasopoulos et al.

(10) Patent No.: US 12,580,226 B2
(45) Date of Patent: Mar. 17, 2026

(54) SOLID-STATE POLYMER ELECTROLYTE FOR AN ENERGY STORAGE DEVICE

(71) Applicant: The Johns Hopkins University, Baltimore, MD (US)

(72) Inventors: Konstantinos Gerasopoulos, Fulton, MD (US); Bing Tan, Ann Arbor, MI (US)

(73) Assignee: The Johns Hopkins University, Baltimore, MD (US)

( * ) Notice: Subject to any disclaimer, the term of this patent is extended or adjusted under 35 U.S.C. 154(b) by 785 days.

(21) Appl. No.: 17/748,371

(22) Filed: May 19, 2022

(65) Prior Publication Data

US 2023/0378529 A1     Nov. 23, 2023

(51) Int. Cl.
| | |
|---|---|
| *H01M 10/0565* | (2010.01) |
| *H01M 4/02* | (2006.01) |
| *H01M 4/485* | (2010.01) |
| *H01M 4/525* | (2010.01) |
| *H01M 4/583* | (2010.01) |
| *H01M 4/62* | (2006.01) |
| *H01M 10/0525* | (2010.01) |

(52) U.S. Cl.
CPC ....... *H01M 10/0565* (2013.01); *H01M 4/485* (2013.01); *H01M 4/525* (2013.01); *H01M 4/583* (2013.01); *H01M 4/623* (2013.01); *H01M 10/0525* (2013.01); *H01M 2004/027* (2013.01); *H01M 2004/028* (2013.01)

(58) Field of Classification Search
CPC ...... H01M 4/485; H01M 4/525; H01M 4/623; H01M 4/625; H01M 10/0565; H01M 2300/0082
See application file for complete search history.

(56) References Cited

U.S. PATENT DOCUMENTS

2022/0109142 A1*    4/2022   He ..........................  H01M 4/13

FOREIGN PATENT DOCUMENTS

| CN | 110931852 | * | 3/2020 |
|---|---|---|---|
| CN | 114284639 | * | 4/2022 |
| CN | 114361575 | * | 4/2022 |

OTHER PUBLICATIONS

English translation of CN Publication 114361575, Apr. 2022.*
English translation of CN Publication 114284639, Apr. 2022.*
English translation of CN Publication 110931852, Mar. 2020.*

(Continued)

*Primary Examiner* — Brittany L Raymond
(74) *Attorney, Agent, or Firm* — Sung T. Kim

(57) ABSTRACT

Aspects of the disclosure provide an energy storage device that can include a cathode, an anode, and a solid polymer electrolyte. The solid polymer electrolyte can include polyvinylidene fluoride (PVDF) and bis(trifluoro-methanesulfonyl)imide (LiTFSI). A mass content of the LiTFSI can be greater than a mass content of the PVDF. The solid polymer electrolyte can have a structural composition based on forming the solid polymer electrolyte using a solution comprising a solid content, comprising the PVDF and LiTFSI, and one or more solvents for dissolving the solid content, the solid content being approximately 0.19 or greater of the solution.

16 Claims, 6 Drawing Sheets

1ˢᵗ charge/discharge at room temperature

(56) References Cited

OTHER PUBLICATIONS

Zhang et al. "Self-Suppression of Lithium Dendrite in All-Solid-State Lithium Metal Batteries with Poly(vinylidene difluoride)-Based Solid Electrolytes." Adv. Mater. 2019, 31. https://doi.org/10.1002/adma.201806082.

Zhou et al., "Understanding the Role of Solvents on the Morphological Structure and Li-Ion Conductivity of Poly (vinylidene fluoride)-Based Polymer Electrolytes." Journal of The Electrochemical Society. 2020. 167 070552.

* cited by examiner

SOLID-STATE POLYMER ELECTROLYTE FOR AN ENERGY STORAGE DEVICE

STATEMENT REGARDING FEDERALLY SPONSORED RESEARCH OR DEVELOPMENT

This invention was made with Government support under Contract No. N00024-13-D-6400 awarded by the United States Department of the Navy. The Government has certain rights in the invention.

TECHNICAL FIELD

The present disclosure relates to electrical energy storage devices, for example, anodes, cathodes, and electrolytes used in energy storage devices (e.g., lithium ion batteries).

BACKGROUND

In the state of the art, energy storage devices such as batteries commonly use liquid electrolytes and polymer separators between the anode and cathode. The configuration allows batteries to exhibit good electrical performance. One contributor to the performance is the ease of ion movement through a liquid phase material (e.g., ion conductivity). A problem with liquid electrolytes is they typically contain flammable and/or toxic solvents. Improper use of batteries (overheating, overcharging, charging too fast without battery management system, etc.) can cause internal shorting and/or raising of internal temperature in the battery. The volatile electrolyte liquid can act as a fuel that contributes to battery fires.

Solid-state electrolytes can mitigate some of these issues. Therefore, there is a growing interest in this technology space to replace liquid electrolytes with solid-state electrolytes. However, implementation of solid-state electrolytes has certain challenges, for example, contact issues between the solid-state electrolyte and an electrode and reduced ion conductivity in a solid medium.

SUMMARY OF SOME EXAMPLES

Accordingly, it is desirable to solve the issues of solid-state electrolytes in order to allow practical implementation in an energy storage device.

In some aspects, an energy storage device can comprise a cathode, an anode, and a solid polymer electrolyte. The solid polymer electrolyte can comprise polyvinylidene fluoride (PVDF) and lithium bis(trifluoromethanesulfonyl)imide (LiTFSI). A mass content of the LiTFSI can be greater than a mass content of the PVDF. The solid polymer electrolyte can have a structural composition based on forming the solid polymer electrolyte using a solution comprising a solid content, comprising the PVDF and LiTFSI, and one or more solvents for dissolving the solid content, the solid content being approximately 0.19 or greater of the solution.

In some aspects, a solid polymer electrolyte can comprise a solid polymer medium comprising polyvinylidene fluoride (PVDF) and lithium bis(trifluoromethanesulfonyl)imide (LiTFSI). A mass content of the LiTFSI can be greater than a mass content of the PVDF. The solid polymer electrolyte can have a structural composition based on forming the solid polymer electrolyte using a solution comprising a solid content, comprising the PVDF and LiTFSI, and one or more solvents for dissolving the solid material, the solid content being approximately 0.19 or greater of the solution.

Further features of the present disclosure, as well as the structure and operation of various aspects, are described in detail below with reference to the accompanying drawings. It is noted that the present disclosure is not limited to the specific aspects described herein. Such aspects are presented for illustrative purposes only. Additional aspects will be apparent to persons skilled in the relevant art(s) based on the aspects described herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use aspects described herein.

Figure 1:
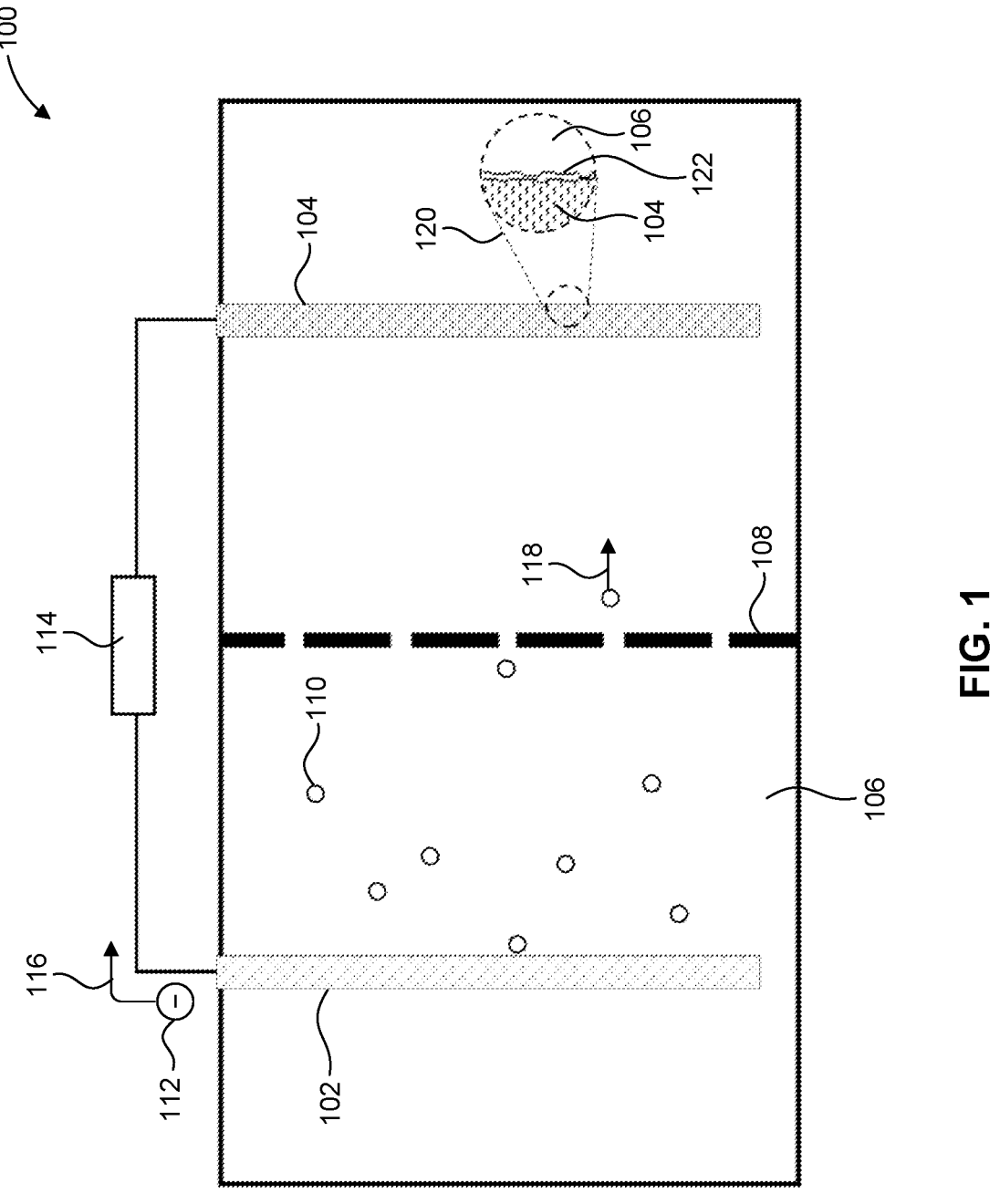
FIG. 1 shows an energy storage device, according to some aspects.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more aspects that incorporate the features of the present disclosure. The disclosed aspect(s) are provided as examples. The scope of the present disclosure is not limited to the disclosed aspect(s). Claimed features are defined by the claims appended hereto.

The aspect(s) described, and references in the specification to "one aspect," "an aspect," "an exemplary aspect," "an example aspect," etc., indicate that the aspect(s) described can include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is understood that it is within the knowledge of one skilled in the art to effect such feature, structure, or characteristic in connection with other aspects whether or not explicitly described.

Spatially relative terms, such as "beneath," "below," "lower," "above," "on," "upper" and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

The term "about," "approximately," or the like can be used herein to indicate a value of a quantity that can vary or be found to be within a range of values, based on a particular technology. Based on the particular technology, the terms can indicate a value of a given quantity that is within, for example, 1-20% of the value (e.g., ±1%, ±5% ±10%, ±15%, or ±20% of the value).

FIG. 1 shows an energy storage device 100, according to some aspects. Those skilled in the art will appreciate that, in some aspects, the drawing in FIG. 1 can be referred to as a cell diagram of energy storage device 100 (or full cell, as opposed to half cell). In some aspects, energy storage device 100 can comprise an anode 102, a cathode 104, an electrolyte 106, a separator 108, and ions 110. The term "electrode" can be used herein to refer to an anode or a cathode. For example, anode 102 can be an electrode that releases electrons 112 when a circuit is completed between anode 102 and cathode 104 via load 114. Anode 102 can comprise a layered structure (e.g., a metal foil coated with an active material, copper or aluminum foil coated with anode active material, or the like). Cathode 104 can comprise a layered structure (e.g., a metal foil coated with an active material, aluminum foil coated with cathode active material, or the like). Electrolyte 106 can comprise a medium that allows the movement of ions 110 between anode 102 and cathode 104. Separator 108 can comprise a permeable membrane to separate anode 102 and cathode 104 so as to prevent electrical shorting between anode 102 and cathode 104. Separator 108 can be porous. The permeability of separator 108 can allow ions 110 to move between anode 102 and cathode 104.

In some aspects, ions 110 can comprise lithium, zinc, sodium, potassium, or the like.

In some aspects, the particular operation illustrated in FIG. 1 is that of discharging energy storage device 100. For example, the direction of current flow 116 indicates a discharging of energy storage device 100 from a high energy state to a low energy state. Similarly, the direction of ion flow 118 indicates a discharging of energy storage device 100 from a high energy state to a low energy state. It should be appreciated that a charging operation can reverse the directions of the flows.

In some aspects, electrolyte 106 can comprise liquid medium. A liquid electrolyte can allow ease of ion flow 118 with low resistance (e.g., high ion conductivity). However, the liquid electrolyte can comprise flammable and/or toxic solvents. Depending on the type of energy storage device, other drawbacks can exist. In aspects directed to a lithium-metal-rechargeable variant of energy storage device 100, dendrites can gradually form at the surface of the anode as the device is recharged over and over again. Dendrites can be tree-like microstructures of metal. Dendrites can cause an electrical short inside energy storage device 100, as well as deteriorate the electrolyte-electrode contact. That is, the performance of energy storage device 100 can be adversely impacted due to the irreversible structural change of electrolyte 106.

Therefore, in some aspects, electrolyte 106 can comprise a non-liquid medium. In some aspects, electrolyte 106 can comprise a gel polymer medium. In some aspects, electrolyte 106 can comprise a solid medium (or solid-state electrolyte). In this scenario, energy storage device 100 can be referred to as a solid-state energy storage device, solid-state battery, or the like. It is noted that the solid medium of electrolyte 106 can begin as a liquid medium during fabrication (in preparation for arriving at a solid phase at the latter stages of fabrication). For example, electrolyte 106 can comprise a mix of polymers that are diluted in a solvent for ease of mixing. Once the mixture is prepared, the solvents can be allowed to evaporate, with the resulting product being a solid medium.

In some aspects, solid-state electrolytes can be accompanied by certain drawbacks (e.g., poor electrolyte-electrode contact, low ion conductivity). Inset 120 illustrates an aspect directed to poor electrolyte-electrode contact. Inset 120 shows interface 122 of two solids in contact, the two solids being cathode 104 and electrolyte 106. Microscopic fluctuations of the solid surfaces of solid cathode 104 and electrolyte 106 can cause the two surfaces to have uneven contact (this scenario is also relevant to the dendrites issue described above).

The inventors have identified solutions that mitigate issues of solid-state electrolytes, thereby allowing practical implementation of solid-state electrolytes in energy storage device 100. Various polymer-based electrolyte compositions were studied (FIGS. 2-6 show measurement data of various electrolyte compositions). In some aspects, electrolyte 106 can comprise polyvinylidene fluoride (PVDF); and lithium bis(trifluoromethanesulfonyl)imide (LiTFSI). A mass content of the LiTFSI can be greater than a mass content of the PVDF (e.g., PVDF/LiTFSI<1/1, PVDF/LiTFSI<1/2, PVDF/LiTFSI<1/3, a mass ratio value between 1/1 and 1/3, or the like). Ion conductivity of electrolyte 106 can be increased with higher content of LiTFSI. Conventional electrolytes use equal amounts of PVDF and LiTFSI as it is challenging to achieve mechanical stability when using higher LiTFSI content.

However, increasing the LiTFSI content in isolation may produce poor results for the structural stability of the solid-state electrolyte. Therefore, the structural composition of electrolyte 106 (e.g., the structure of the solid medium) can be based on the process of forming electrolyte 106 using a solution with a given solid content and one or more solvents for dissolving the solid content. Solvents can include those that target the specific composition of the solid content, for example, N,N-dimethylformamide (DMF), dimethyl sulfoxide (DMSO), N-methylpyrrolidone (NMP)dimethylacetamide (DMAc), or the like.

In some aspects, the solid content can comprise PVDF and LiTFSI. The solid content can be approximately 0.19 or greater of the solution (1.0 indicates full solid content and values less than 1.0 indicate partial solid content). The solid content can also comprise lithium lanthanum zirconate oxide (LLZO). A mass content of the LLZO can be less than a mass content of the PVDF. For example, the mass content of the PVDF can be approximately two times a mass content of the LLZO or greater (e.g., LLZO/PVDF≤1/2, LLZO/PVDF<1/3, a mass ratio value between 1/2 and 1/3, or the like). The introduction of LLZO can reduce ion conductivity slightly. However the trade-off can be improvement of mechanical strength of the solid medium. LLZO can be added by an amount that corresponds to a given threshold of ion conductivity.

In some aspects, PAA (polyacrylic acid) could be added as a co-polymer for PVDF to increase the ionic conductivity and improve the film quality. A mass content of the PVDF can be approximately nine times a mass content of the PAA or greater (e.g., PAA/PVDF≤1/9, PAA/PVDF≤1/20, a mass ratio value between 1/9 and 1/20, or the like).

In some aspects, the solid medium can be structured as a film with sufficient structural stability to endure being peeled from a host substrate with mechanical tools (e.g., tweezer, tongs, or the like). The film aspect can be used in, for example, flexible textile energy storage devices. In some aspects, the solid medium can be bulk solid structure. Aspects are not limited to flexible energy storage devices. For example, structures of energy storage device 100 can include flexible textile battery, coin cell battery, cylinder batteries (e.g., AA size), box batteries (e.g., vehicle battery), or the like.

In some aspects, electrolyte 106 can comprise a plasticizer additive to enhance flexibility of the solid medium of electrolyte 106. An electrolyte that is too rigid can be susceptible to mechanical failure (e.g., breakage, detachment, or the like) due to mechanical impact, shock, deformation, or the like. A mass content of the PVDF can be approximately two times a mass content of the plasticizer or greater. The plasticizer can comprise a nitrile plasticizer. For example, the plasticizer can comprise succinonitrile (SN), vinylene carbonate (VC), SN and VC, or the like.

Table 1 below shows measurement electrical performance data for some of the compositions of electrolyte 106 described above, according to some aspects. In some aspects, an electrolyte sample was made to a certain thickness and then sandwiched between two stainless steel disks (also called blocking electrodes). The entire assembly was placed in a coin cell and pressed to prevent ambient exposure. The cell (electrode/electrolyte/electrode) was subjected to an electrochemical impedance spectroscopy (EIS) measurement. EIS is a technique that can be used to measure electrolyte ionic conductivity. An AC signal was applied between the two electrodes with a magnitude of 25 mV. The frequency was swept from about 1 MHz down to 0.1 Hz. The EIS data was plotted in a Nyquist plot (Zreal vs–Zimg) and the electrolyte resistance value shown in Table 1 was extracted from the intercept of the spectra with the real axis.

TABLE 1

| Measurements of Electrolyte Compositions | | | |
| --- | --- | --- | --- |
| Electrolyte Composition Mass Ratios | Film Thickness (μm) | Resistance (Ω) | Ion Conductivity (mS/cm) |
| A: PVDF 2/LiTFSI 1 | 50 | 209.1 | 0.01 |
| B: PVDF 1/LiTFSI 1 | 70 | 182.9 | 0.02 |
| C: PVDF 1/LiTFSI 2.3 | 120 | 42.73 | 0.14 |
| D: PVDF 1/LiTFSI 2.3/ LLZO 0.11 | 120 | 63.34 | 0.09 |
| E: PVDF 1/LiTFSI 2.3/LLZO 0.2 | 90 | 45.02 | 0.10 |
| F: PVDF 1/LiTFSI 2.3/LLZO 0.4 | 95 | 48.96 | 0.10 |
| G: PVDF 1/LiTFSI 2.3/ LLZO 0.11/SN 0.3 | 84 | 29.76 | 0.14 |
| H: PVDF 1/LiTFSI 2.3/ LLZO 0.11/VC 0.2 | 120 | 25.63 | 0.23 |
| I: PVDF 0.95/PAA 0.05/ LiTFSI 2.28/LLZO 0.2 | 93 | 43.17 | 0.11 |

In some aspects, Table 1 includes a batch of experimental electrolyte compositions A, B, and C that included different ratios of PVDF and LiTFSI (e.g., PVDF/LiTFSI at 2/1, 1/1, and 1/2.3) without additional additives. The data in Table 1 corroborates the earlier statement that ion conductivity of electrolyte 106 can be increased with higher content of LiTFSI.

In some aspects, the next batch of experimental compositions D, E, and F included variations of LLZO content while maintaining the PVDF and LiTFSI ratio constant (e.g., PVDF/LiTFSI/LLZO at 1/2.3/0.11, 1/2.3/0.2, and 1/2.3/0.4). Though it may not be the case for the specific compositions in Table 1, it is still expected that ion conductivity can suffer if LLZO content is increased beyond a given amount. However, at least for the compositions D, E, and F, it is found that LLZO content can be increased to the quantities shown in Table 1 in order to increase the mechanical strength of electrolyte 106 with minimal adverse impact to ion conductivity.

In some aspects, compositions G and H included SN and VC content, respectively, while maintaining the PVDF, LiTFSI, and LLZO ratios constant. The plasticizers SN and VC were of interest for enhancing the flexibility of electrolyte 106. Composition D can be used as a reference for evaluating compositions G and H. It is seen that both SN and VC were able to increase ion conductivity when added to the PVDF, LiTFSI, and LLZO content of composition D.

In some aspects, composition I included PAA in addition to PVDF, LiTFSI, and LLZO (compare to composition E without PAA). The goal of PAA was to increase both mechanical film quality as well as ion conductivity. Table 1 shows that PAA increases ion conductivity.

Figure 2:
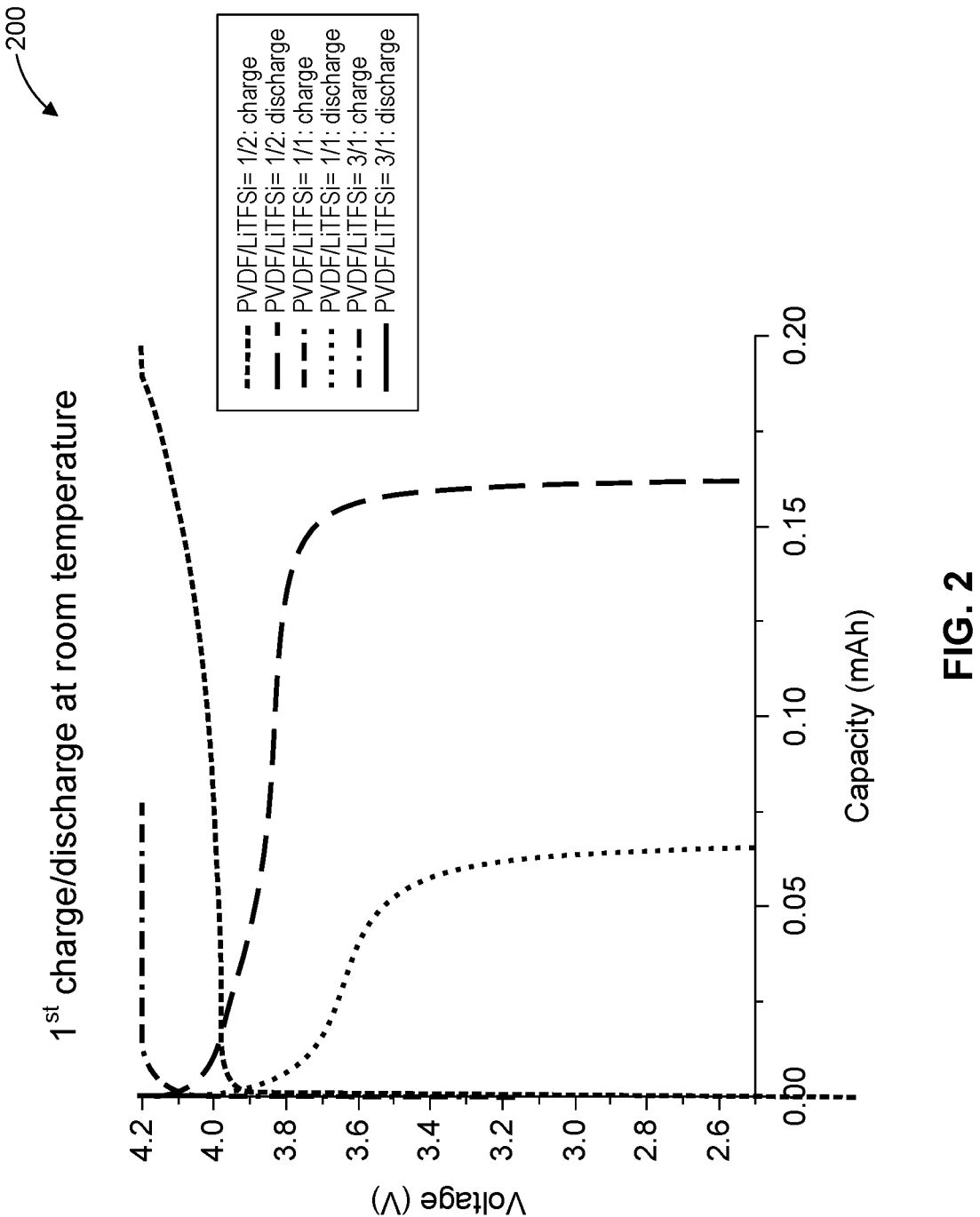
FIGS. 2-6 show graph plots for measurement data of energy storage devices that were tested to probe the effects of electrolyte composition mass ratios, according to some aspects.

FIG. 2 shows a graph plot 200 for measurement data of energy storage cells that were tested to probe the effects of PVDF/LiTFSI mass ratios, according to some aspects. In some aspects, the vertical axis represents a measured voltage of the tested energy storage cells. The horizontal axis represents a measured charge capacity (or discharge capacity, as the case may be) of the tested energy storage cells. The particular cells tested were of a coin cell construction. The coin cells in this example used a cathode that comprised a mass ratio of lithium cobalt oxide (LCO) 85/carbon nanotubes (CNT) 3/PVDF 10/LiTFSI 1/ethyl carbonate (EC) 1. The coin cells in this example also used an anode comprising lithium metal. The cell capacities were designed with a target capacity of 0.26 mAh and tested at C/10 rates. Those skilled in the art will appreciate that testing can be performed at a given C rate. Those skilled in the art will appreciate a battery "C rate" or "C rating" relates to an energy storage device's charge and discharge rates when assessing its capacity. As a non-limiting example, C/10 can refer to a discharge test that spans 10 hours. Other C rates can be used for testing energy storage devices disclosed herein With the anode and cathodes unchanged, the different electrolyte compositions were varied for the testing. One electrolyte composition comprised PVDF 3/LiTFSI 1/LLZO 0.33 (labeled PVDF/LiTFSI=3/1 in FIG. 2). Another electrolyte composition comprised PVDF 1/LiTFSI 1/LLZO 0.11 (labeled PVDF/LiTFSI=1/1 in FIG. 2). Yet another electrolyte composition comprised PVDF 1/LiTFSI 2/LLZO 0.2/SN 0.2 (labeled PVDF/LiTFSI=1/2 in FIG. 2). The PVDF/LiTFSI=3/1 composition had the poorest performance and are nearly indistinguishable from the vertical axis. The composition that exhibited the highest capacity was the PVDF/LiTFSI=1/2 composition (i.e., the composition with more LiTFSI content). According to the measurements, increasing LiTFSI content enhances energy storage performance.

Figure 3:
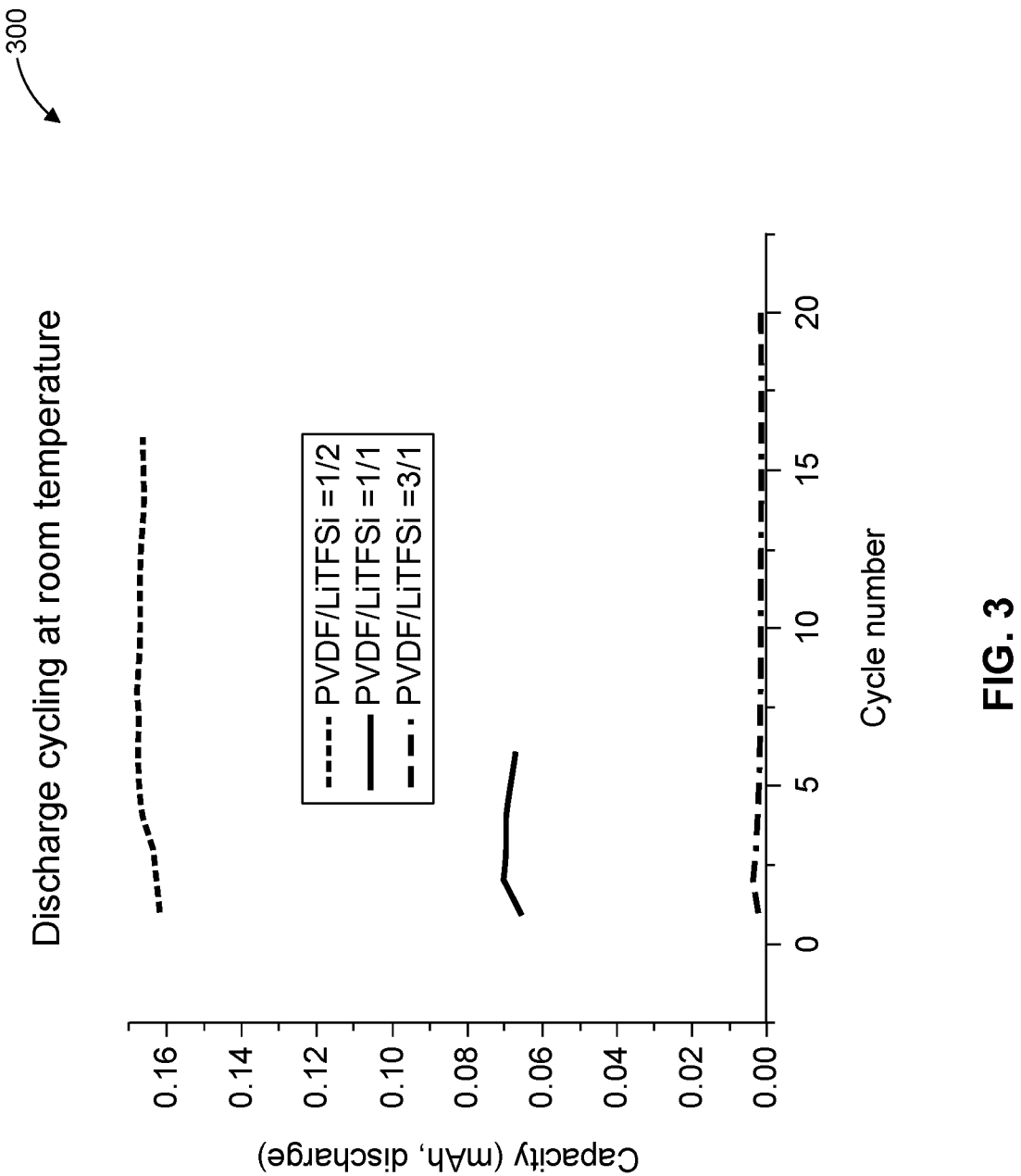

FIG. 3 shows a graph plot 300 for measurement data of energy storage cells that were tested to probe the effects of PVDF/LiTFSI mass ratios, according to some aspects. In some aspects, the vertical axis represents a measured discharge capacity of the tested energy storage cells. The horizontal axis represents the number of charge/discharge cycles performed on the tested energy storage cells. In one aspect, the tested energy storage cells are the same ones that were shown in FIG. 2 (e.g., those that were labeled PVDF/LiTFSI=2/1, PVDF/LiTFSI=1/1, and PVDF/LiTFSI=1/3, and having the same cathodes, anodes, and C/10 rates). The particular tests in FIG. 3 show the effects of multiple cycles of the energy storage cells at room temperature (e.g., about 22° C.). The composition that exhibited the highest capacity was the PVDF/LiTFSI=1/2 composition (i.e., the composition with more LiTFSI content). Furthermore, the discharge capacity of the energy storage cell with the PVDF/LiTFSI=1/2 composition was stable and flat throughout a plurality of cycles.

Figure 4:
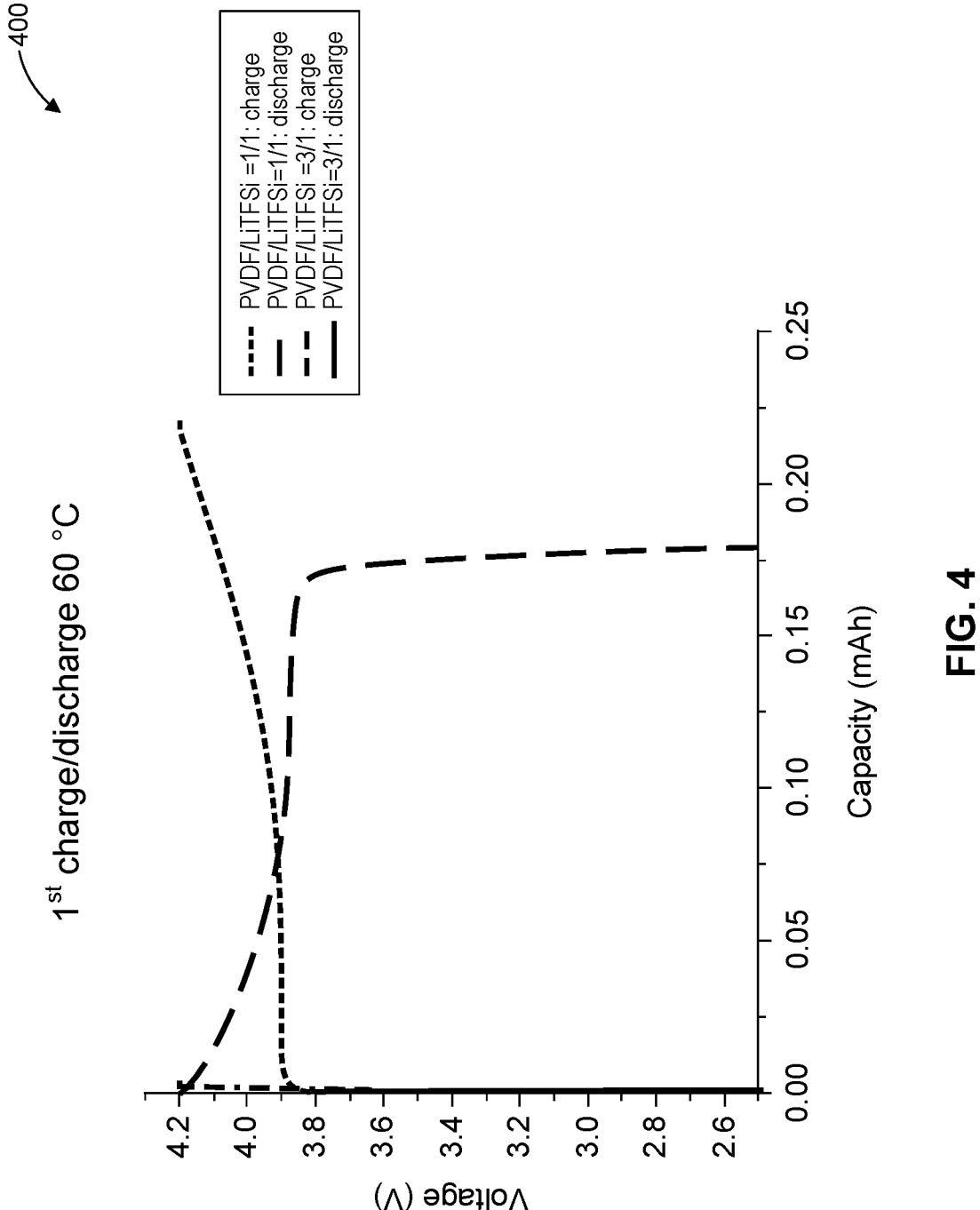

FIG. 4 shows a graph plot 400 for measurement data of energy storage cells that were tested to probe the effects of PVDF/LiTFSI mass ratios, according to some aspects. In some aspects, the vertical axis represents a measured voltage of the tested energy storage cells. The horizontal axis represents a measured charge capacity (or discharge capacity, as the case may be) of the tested energy storage cells. In some aspects, the tested energy storage cells can be some of the same ones that were shown in FIG. 2 (e.g., those that were labeled PVDF/LiTFSI=1/1 and PVDF/LiTFSI=1/3, and having the same cathodes, anodes, and C/10 rates). The particular tests in FIG. 4 show the effects of a charge/discharge cycle of the energy storage cells at about 60° C.). The composition that exhibited the highest capacity was the PVDF/LiTFSI=1/1 composition (i.e., the composition with more LiTFSI content among those tested).

Figure 5:
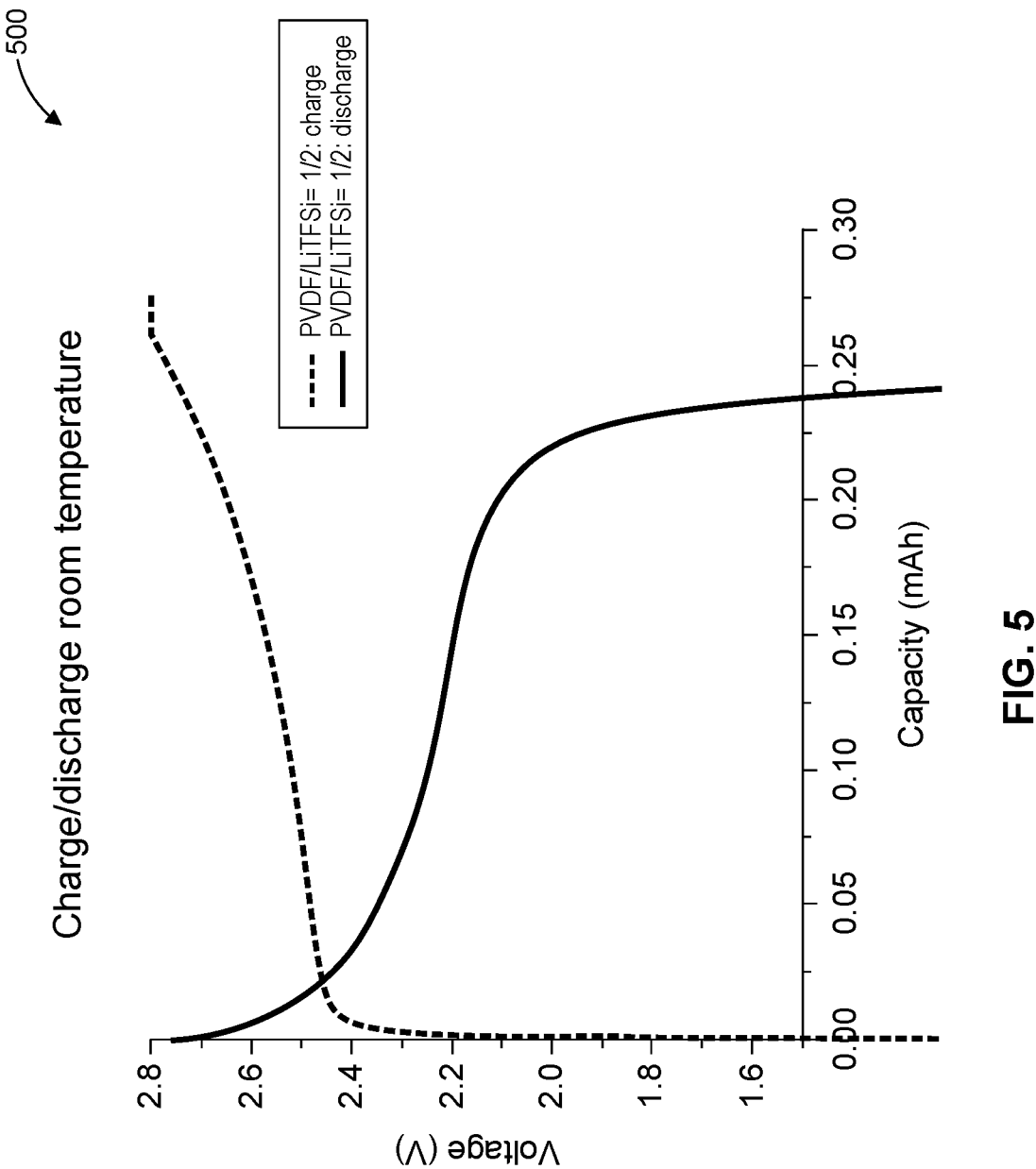

FIG. 5 shows a graph plot 500 for measurement data of an energy storage cell, according to some aspects. In some aspects, a composition similar to the one labeled PVDF/LiTFSI=2/1 in FIG. 2 was the one tested for FIG. 5. While the coin cell construction, cathode, and polymer electrolyte were designed as in FIG. 2, the anode comprised a mass ratio of lithium titanium oxide (LTO) 85/CNT 3/PVDF 10/LiTFSI 1/SN 1. The designed cell capacity was 0.40 mAh and the testing was performed at C/10 rates and at room temperature. In FIG. 5, the vertical axis represents a measured voltage of the tested energy storage cells. The horizontal axis represents a measured charge capacity (or discharge capacity, as the case may be) of the tested energy storage cells. The measurement data shows that the delivered capacity at room temperature was about 0.24 mAh—60% capacity retention of the designed cell capacity of 0.40 mAh.

Figure 6:
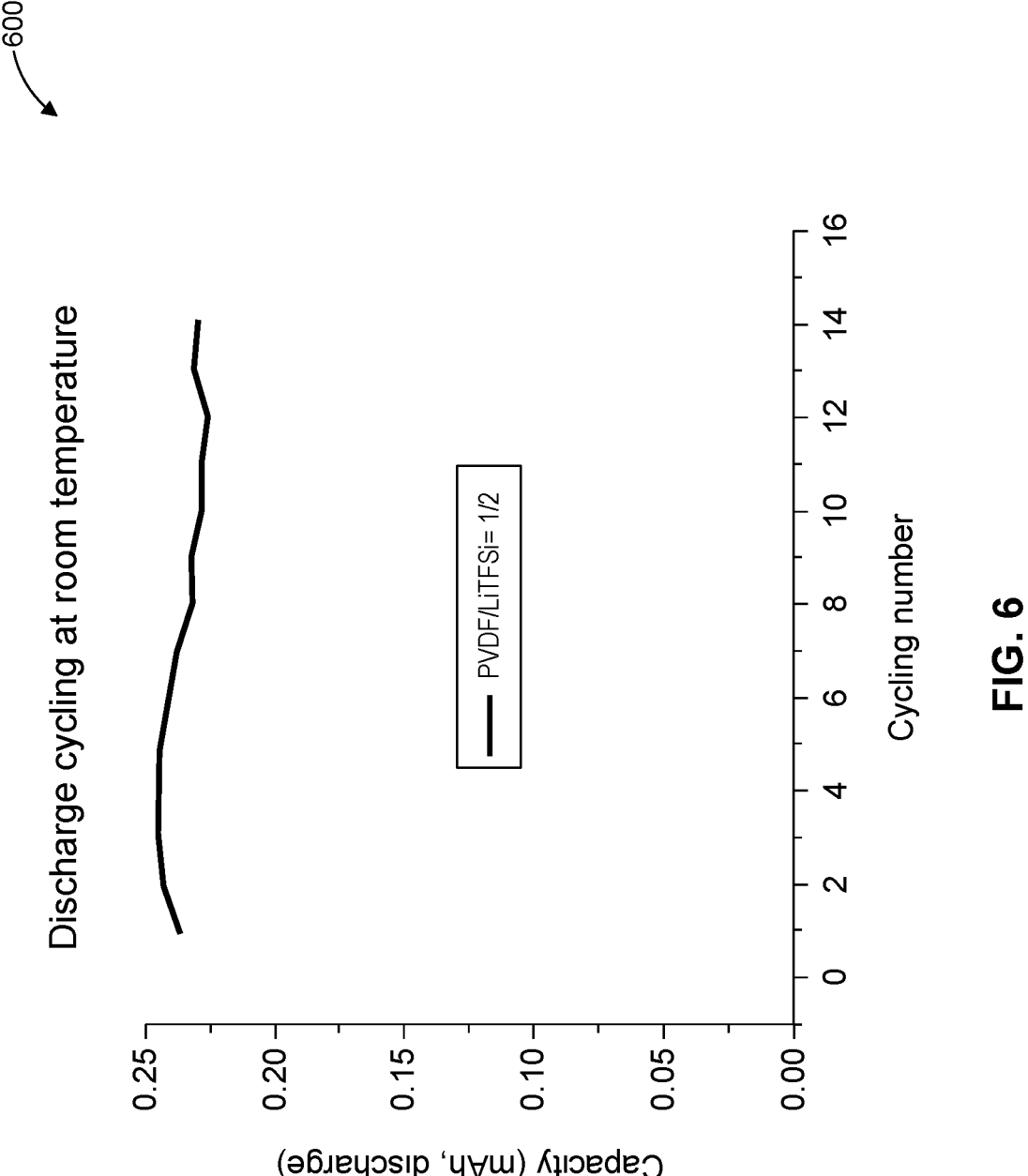

FIG. 6 shows a graph plot 600 for measurement data of an energy storage cell, according to some aspects. In some aspects, the vertical axis represents a measured discharge capacity of the tested energy storage cell. The horizontal axis represents the number of charge/discharge cycles performed on the tested energy storage cell. In some aspects, the tested energy storage cells are the same ones that were shown in FIG. 5. The tested energy storage cell showed stable cycling life at room temperature, performed at C/10 rates.

The steps of the methods disclosed herein can be performed in any conceivable order and it is not required that all steps be performed. Moreover, the method steps described herein merely reflect non-limiting based on the present disclosure. That is, a method is not limited to only those steps explicitly described. It should be appreciated that further method steps and functions are envisaged based on functions described in reference to aspects herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific aspects of the disclosure have been described above, it will be appreciated that aspects of the present disclosure can be practiced otherwise than as described. The descriptions are intended to be illustrative, not limiting. Thus it will be apparent to one skilled in the art that modifications can be made to the disclosure as described without departing from the scope of the claims set out below.

The foregoing description of the specific aspects will so fully reveal the general nature of the present disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein.

The breadth and scope of the protected subject matter should not be limited by any of the above-described exemplary aspects, but should be defined only in accordance with the following claims and their equivalents.

What is claimed is:

1. An energy storage device comprising:
   a cathode;
   an anode; and
   a solid polymer electrolyte comprising:
       polyvinylidene fluoride (PVDF);
       lithium lanthanum zirconate oxide (LLZO); and
       bis(trifluoromethanesulfonyl)imide (LiTFSI), wherein
           a mass content of the LiTFSI is greater than a mass content of the PVDF,
           a mass content of the PVDF is greater than or equal to approximately two times a mass content of the LLZO, and
           the solid polymer electrolyte has a structural composition based on forming the solid polymer electrolyte using a solution comprising a solid content, comprising the PVDF, LLZO, and LiTFSI, and one or more solvents for dissolving the solid content, the solid content being approximately 0.19 or greater of the solution.

2. The energy storage device of claim 1, wherein the structural composition is a film.

3. The energy storage device of claim 1, wherein the mass content of the LiTFSI is approximately two times the mass content of the PVDF or greater.

4. The energy storage device of claim 1, wherein:
   the solid polymer electrolyte further comprises a poly(acrylic acid) (PAA);
   a mass content of the PVDF is approximately nine times a mass content of the PAA or greater; and
   the solid content further comprises the PAA.

5. The energy storage device of claim 1, wherein:
   the solid polymer electrolyte further comprises a plasticizer; and
   a mass content of the PVDF is approximately two times a mass content of the plasticizer or greater.

6. The energy storage device of claim 5, wherein the plasticizer comprises succinonitrile (SN), vinylene carbonate (VC), or SN and VC.

7. The energy storage device of claim 1, wherein the cathode comprises lithium cobalt oxide (LCO), carbon nanotubes (CNT), PVDF, LiTFSI, and ethyl carbonate (EC).

8. The energy storage device of claim 1, wherein the anode comprises lithium titanium oxide (LTO), carbon nanotubes (CNT), PVDF, LiTFSI, and succinonitrile (SN).

9. A solid polymer electrolyte comprising:

a solid polymer medium comprising:

polyvinylidene fluoride (PVDF);

lithium lanthanum zirconate oxide (LLZO); and bis(trifluoromethanesulfonyl)imide (LiTFSI), wherein a mass content of the LiTFSI is greater than a mass content of the PVDF, a mass content of the PVDF is greater than or equal to approximately two times a mass content of the LLZO, and the solid polymer electrolyte has a structural composition based on forming the solid polymer electrolyte using a solution comprising a solid content, comprising the PVDF, LLZO, and LiTFSI, and one or more solvents for dissolving the solid material, the solid content being approximately 0.19 or greater of the solution.

10. The solid polymer electrolyte of claim 9, wherein structural composition is a film.

11. The solid polymer electrolyte of claim 9, wherein the mass content of the LiTFSI is approximately two times the mass content of the PVDF or greater.

12. The solid polymer electrolyte of claim 9, wherein:

the solid polymer medium further comprises a poly (acrylic acid) (PAA);

a mass content of the PVDF is approximately nine times a mass content of the PAA or greater; and the solid content further comprises the PAA.

13. The solid polymer electrolyte of claim 9, further comprising:

a plasticizer, wherein a mass content of the PVDF is approximately two times a mass content of the plasticaizer or greater.

14. The solid polymer electrolyte of claim 13, wherein the plasticizer comprises succinonitrile (SN), vinylene carbonate (VC), or SN and VC.

15. The solid polymer electrolyte of claim 9, wherein the solid polymer electrolyte is disposed in an energy cell having a cathode comprising lithium cobalt oxide (LCO), carbon nanotubes (CNT), PVDF, LiTFSI, and ethyl carbonate (EC).

16. The solid polymer electrolyte of claim 9, wherein the solid polymer electrolyte is disposed in an energy cell having an anode comprising lithium titanium oxide (LTO), carbon nanotubes (CNT), PVDF, LiTFSI, and succinonitrile (SN).

\* \* \* \* \*